United States Patent

Kawasaki et al.

[11] Patent Number: 4,625,860
[45] Date of Patent: Dec. 2, 1986

[54] TUBULAR BELT CONVEYOR

[75] Inventors: Mikio Kawasaki, Suita; Kiyoshi Matsumoto, Takarazuka, both of Japan

[73] Assignee: Sumitomo Heavy Industries, Ltd, Tokyo, Japan

[21] Appl. No.: 705,257

[22] Filed: Feb. 25, 1985

[51] Int. Cl.[4] ............. B65G 15/08; B65G 15/40; B65G 39/12
[52] U.S. Cl. ................................... 198/819
[58] Field of Search ............ 198/819, 826, 818, 821, 198/823, 824, 825, 828, 829

[56] References Cited

U.S. PATENT DOCUMENTS

| 2,688,394 | 9/1954 | Hurd et al. | 198/826 |
| 3,338,383 | 8/1967 | Hashimoto | 198/819 |
| 3,429,422 | 2/1969 | Yoshimura | 198/819 |
| 4,402,395 | 9/1983 | Hashimoto | 198/819 |
| 4,410,082 | 10/1983 | McGinnis | 198/819 |
| 4,526,272 | 7/1985 | Peterson | 198/819 |

FOREIGN PATENT DOCUMENTS

| 899271 | 5/1972 | Canada | 198/819 |
| 50962 | 5/1982 | European Pat. Off. | 198/819 |
| 8202374 | 7/1982 | Int'l Pat. Institute | 198/826 |
| 45-4582 | 3/1970 | Japan . | |
| 45-4584 | 3/1970 | Japan . | |
| 47-30283 | 12/1972 | Japan . | |
| 55-117406 | 8/1980 | Japan . | |
| 57-81009 | 5/1982 | Japan | 198/819 |
| 58-104807 | 6/1983 | Japan . | |
| 58-156228 | 8/1983 | Japan . | |
| 58-154353 | 10/1983 | Japan . | |
| 59-173612 | 11/1984 | Japan . | |

Primary Examiner—Joseph E. Valenza
Assistant Examiner—Daniel R. Alexander
Attorney, Agent, or Firm—Armstrong, Nikaido, Marmelstein & Kubovcik

[57] ABSTRACT

A tubular belt conveyor has an endless belt having a substantially flat cross-section with constant thickness over the breadth thereof. The belt is deformed over its breadth in a curved fashion such that the longitudinal side edges of one surface are brought into abutment with each other thus forming a tube, with the adjacent edges constituting a longitudinal lug projecting radially outwardly from the tube portion. The lug is clamped and held on both sides by a pair of guide rollers and pressed at its radially outer end surface by a pressing roller. The tubular form of the belt is maintained by a plurality of tube-forming rollers surrounding the tube portion of the belt. The flat belt is easy to produce and can be coiled in a compact manner for easy packaging. Local wear of the belt due to contact with the axial end edges of the pulley is avoided because the pulley at each end of the conveyor may have an axial length greater than the breadth of the belt, because of the flat cross-section of the belt.

5 Claims, 14 Drawing Figures

TUBULAR BELT CONVEYOR

BACKGROUND OF THE INVENTION

The present invention relates to a tubular belt conveyor having an endless belt which is held in a flattened form at the upstream supplying end and downstream discharging end of the conveyor but is rounded along its neutral axis at its intermediate portion such as to wrap and conceal the material which is being conveyed by the conveyor.

Tubular belt conveyors of the type mentioned above are widely used in the transportation of ores because they can effectively prevent flying and scattering of ore, powders and dust while avoiding the risk of ores dropping off the conveyor. A typical example of the tubular belt conveyor of the kind described employs a flat endless conveyor belt which is rounded along the breadth thereof such as to form a "tube" with both longitudinal sides thereof abutting each other in such a manner as to form a radially extending lug along the length of the belt. More specifically, in this known tubular belt conveyor, a pair of beads are formed on the reverse side of the belt in the flattened state along both longitudinal side edges such that, when the belt is bent and the longitudinal side edges of one surface are brought together to form the "tube", the pair of beads in combination form a longitudinal lug, leaving recesses between the lug and the tube portion of the belt on both sides of the lug in such a manner as to form a neck. In the operation of this tubular belt conveyor, a pair of carrier rollers engage with this neck such as to pinch and suspend the running belt.

In this known tubular belt conveyor, however, the following problems are encountered due to the presence of longitudinal beads on the reverse side of the belt along both longitudinal side edges.

(1) At the material feeding and discharging ends of the conveyor, the belt is guided or driven by pulleys. In order to attain a close fit of the belt to the pulleys, the breadth of the pulleys has to be smaller than the overall breadth of the belt. Consequently, the portions of the belt contacted by both longitudinal edges of the pulleys are worn locally and more heavily than other portions of the belt.

(2) The beads are liable to be cut, particularly when the belt runs along a winding path.

(3) The production of a belt having a complicated cross-section around the beads requires a special mold for vulcanization.

(4) The winding or coiling of the belt for packaging purposes is difficult and the size of the package becomes large due to the presence of the beads.

SUMMARY OF THE INVENTION

Accordingly, an object of the invention is to provide a tubular belt conveyor having a flat endless belt of a constant thickness over its breadth, thus overcoming the above-described problems of the prior art.

To this end, according to one aspect of the invention, there is provided a tubular belt conveyor having a substantially flat endless belt adapted for running between pulleys disposed at a material supplying end and a material discharging end, and a plurality of belt supporting and guiding means arranged in the direction of running of the endless belt and adapted for guiding the running belt while deforming it into a tubular form, wherein the endless belt has a substantially uniform thickness over its breadth and is deformable into a tubular form such that both longitudinal side edge portions thereof abut each other on the side thereof which is contacted by the material being conveyor thus forming a lug extending along the tube formed by the belt, and wherein each of the belt guiding and supporting means includes a frame through which the deformed belt passes and on which are mounted a pair of guide rollers adapted to clamp the lug from both sides thereof, a pressing roller having an axis orthogonal to the axes of the guide rollers and engageable with the radially outer end surface of the lug, and a plurality of tube forming rollers arranged in angularly spaced relationship with each other around said tube such as to engage the outer peripheral surface of the tube formed by the belt, thus maintaining the tubular form of the belt.

Preferably, in the tubular belt conveyor of the invention, the pressing rollers and the tube-forming rollers are supported by respective roller supports which are secured to the frame through adjusting means for free adjustment of positions in the radial directions, and the adjusting means for a pair of the tube-forming rollers adjacent the guide rollers are arranged such as to allow the axes of the rollers to be adjusted within a plane perpendicular to the tube formed by the belt, so that the tubular belt conveyor is adaptable to a variety of belt breadths.

Owing to the use of a flat belt in this invention, the thickness of the lug on the "tube" of the belt is reduced, so that the belt may smoothly run along any curved section of the path. When the belt runs along a curved path, different levels of tension are generated in radially inner and outer portions of the belt as viewed from the center of curvature of the path, resulting in a slip in the lug constituted by both longitudinal side edges of the belt.

This problem, however, is overcome by an embodiment of the invention in which the guide rollers and the pressing roller of the belt supporting and guiding means provided at the curved portion of the belt path are mounted on the frame with an angular offset in the direction opposite to the center of curvature of the path. With such angular offset, if one of a pair of tube-forming rollers adjacent the above-mentioned guide roller disposed on the same side as the above-mentioned angular offset interferes with the guide roller, the former roller may be omitted. With this arrangement, the lug of the belt running along the curved path is inclined radially outwardly such as to generate a tension in the radially inner portion of the belt around the center of the curvature of the path, thus eliminating any difference in the tension between the outer and inner portions of the belt and thereby eliminating the aforementioned slip in the lug of the belt.

The above and other objects, features and advantages of the invention will become clear from the following description of the preferred embodiments when the same is read in conjunction with the accompanying drawings.

DESCRIPTION OF THE PREFERRED EMBODIMENTS

Figure 1:
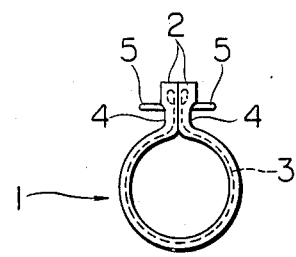
FIG. 1 is a cross-sectional view of a belt used in a conventional tubular belt conveyor, in a state wherein it is bent into a tubular form.
Figure 2:
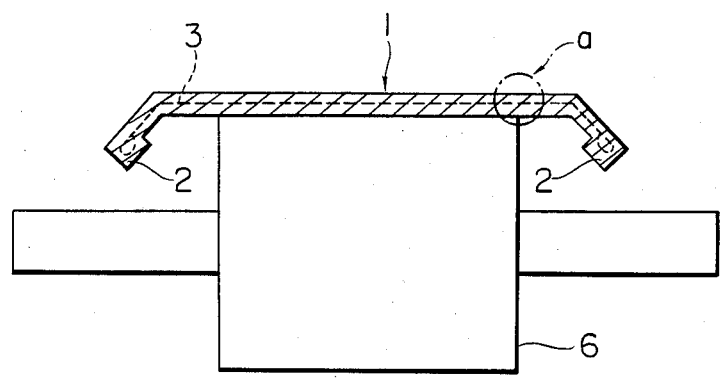
FIG. 2 is a cross-sectional view of a belt of the conventional tubular belt conveyor, in a state in which it is flattened and passing over a pulley disposed at one end of the conveyor.

In advance of the description of the embodiments, a typical example of the prior art will be explained with specific reference to FIGS. 1 and 2, in order to clarify the problems of the prior art and, hence, the object to be achieved by the invention. This conventional tubular belt conveyor has an endless belt 1 which is stretched between pulleys 6 (one of them is shown in FIG. 2) disposed both at the material supplying end and the material discharging end of the conveyor. When the belt turns around these pulleys, it is substantially flattened as shown in FIG. 2, whereas the intermediate portion of the belt between both ends of the conveyor is bent along the breadth thereof to present a tubular form as shown in FIG. 1. In this state, both longitudinal side edges of the belt depend obliquely downwardly as shown in FIG. 2. A longitudinal bead 2 is formed along each longitudinal side edge of the belt 1 on the outer side of the belt. The term "outer side of the belt" is used in this specification to mean the side of the belt opposite the side contacted by the material which is being conveyed. Thus, the side of the belt contacted by the material is naturally referred to as the "inner side of the belt". When the belt is bent along its breadth into the form of a tube with both edge portions of the inner side abutting each other as shown in FIG. 1, the beads 2,2 in combination constitute a longitudinal lug of a certain thickness such that a neck portion 4 is formed between the lug and the tube portion of the belt. In operation, the belt bent in this tubular form is pinched and guided at its neck portion 4 by a pair of carrier rollers 5,5 opposing each other. A reference numeral 3 denotes the core of the belt made of canvas and embedded in the material of the belt.

In this known tubular belt conveyor, the overall breadth of the belt must be greater than the spun or axial length of the pulley 6, in order that the beads 2,2 clear the pulley 6, so that heavy local wear takes place in the portions of the outer side of the belt contactable with the axial end edges of the pulley 6, as marked by a in FIG. 2. In addition, when the belt winds, the beads 2,2 tend to be cut by the end edges of the pulleys 6. In addition, the presence of the beads 2,2 makes it difficult to produce the belt and hinders the coiling of the belt for packaging purposes.

Figure 3:
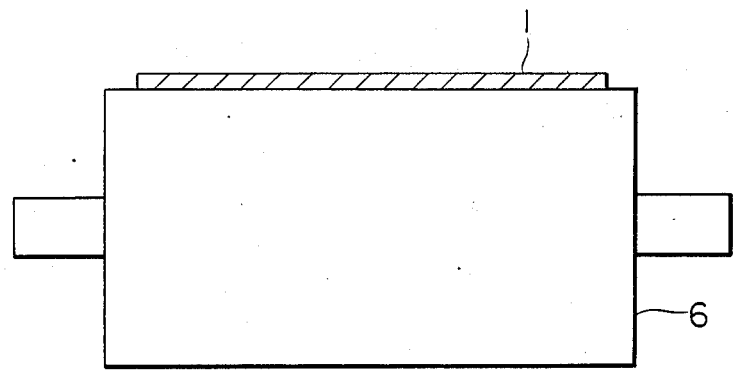
FIG. 3 is a cross-sectional view of a belt used in a tubular belt conveyor embodying the present invention, in a state in which it is flattened and passing over a pulley provided at one end of the conveyor.

These problems of the prior art can be overcome by the tubular belt conveyor of the invention in which, as shown in FIG. 3, an endless belt having a uniform thickness over its breadth and having a breadth smaller than the axial length of the pulley is used in place of the conventional belt having longitudinal beads. The invention provides also a special arrangement for deforming this belt into a tubular form and supporting and guiding the tube of the endless belt.

Figure 4:
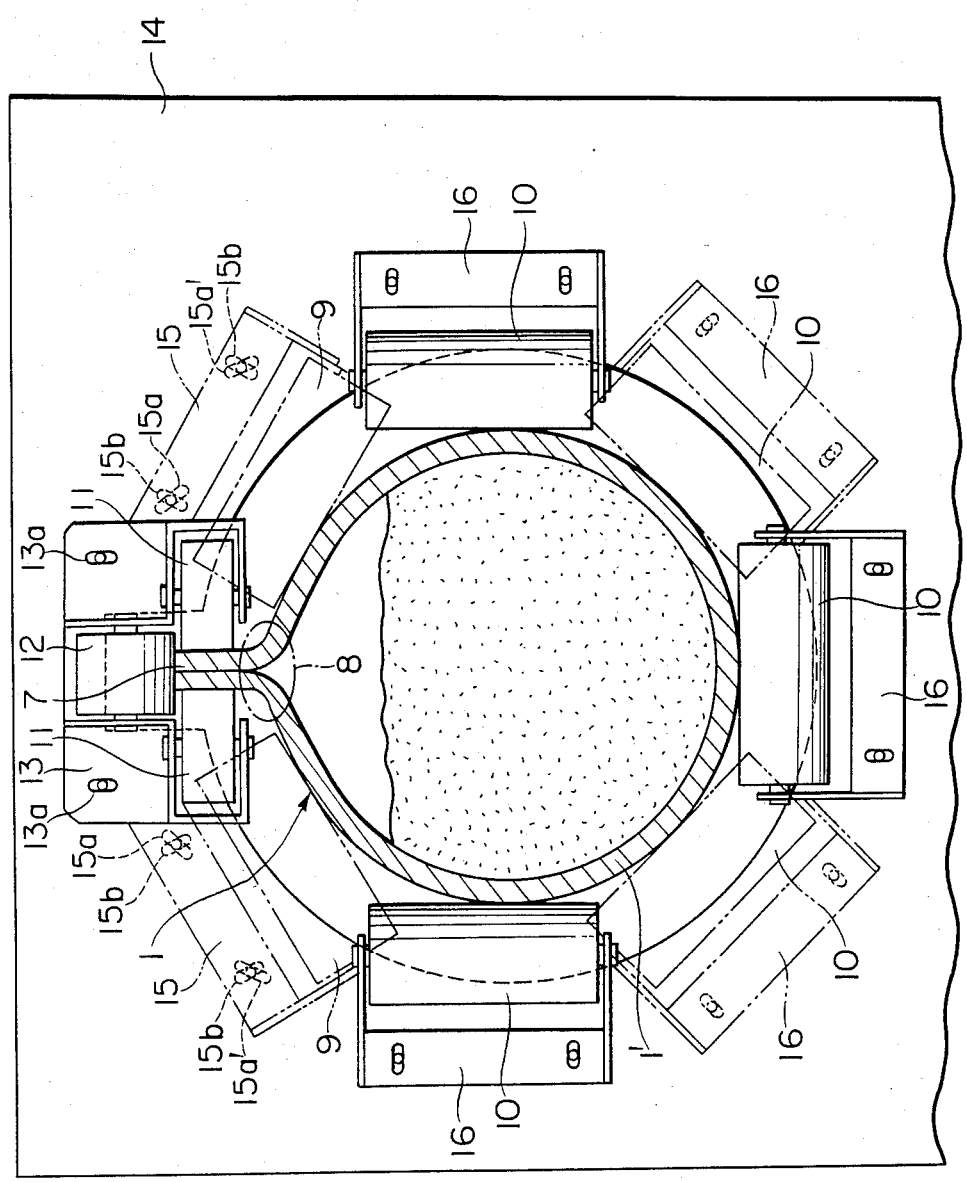
FIG. 4 is a front elevational view of a supporting and guiding means used in the tubular belt conveyor of the invention for the purpose of deforming the belt into the form of a tube and supporting and guiding the tube of the belt.
Figure 5:
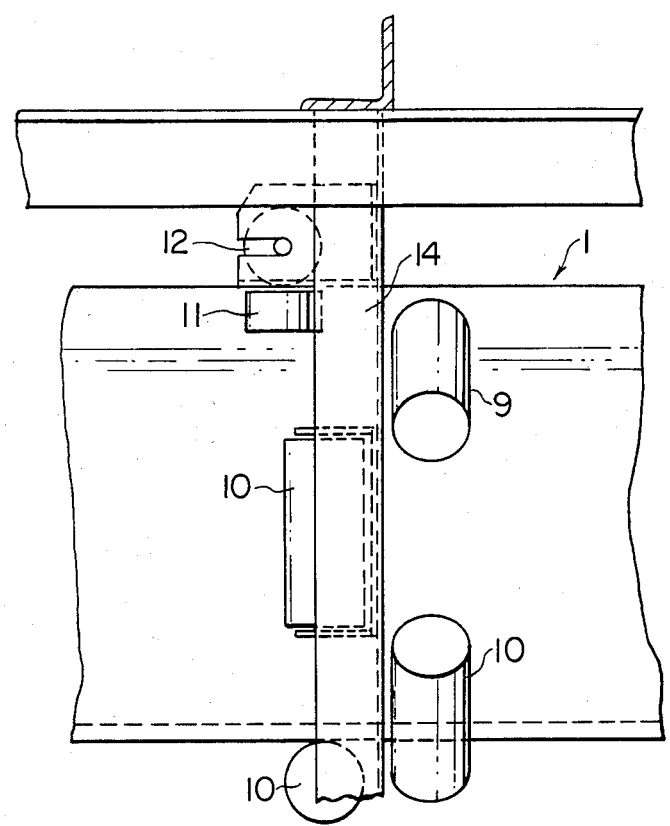
FIG. 5 is a schematic side elevational view showing the arrangement of rollers in the supporting and guiding means shown in FIG. 4.

FIGS. 4 and 5 show an example of the belt supporting and guiding means incorporated in a tubular belt conveyor embodying the present invention. The tubular belt conveyor of the invention employs this belt supporting and guiding means in a plurality disposed along the upper and lower runs of the belt. Usually a supporting and guiding means for the upper run and a supporting and guiding means for the lower run are paired to be arranged in symmetry and carried by a common frame. In FIGS. 4 and 5, however, only one of the belt supporting and guiding means for the upper run of the belt is shown by way of example. As shown in FIG. 4, the belt 1 is deformed into a tubular form. The edges of the inner surface of the belt are brought into abutment with each other to form a longitudinal lug 7 projecting outwardly at the upper portion of the tube as viewed in FIG. 4.

In the deformed state as shown in FIG. 4, the belt has a main portion 1' forming a closed tube (referred to as tube portion 1', hereinunder), the lug 7 constituted by the abutting side edges of the belt, and a flexible intermediate portion 8 between the tube portion 1' and the lug 7. The intermediate portion 8 is made of a flexible material different from the material of the other portions of the belt or is made devoid of the canvas core, so that it exhibits a greater flexibility than other portions of the belt.

The tubular form of the belt is maintained by a pair of tube-forming rollers 9 provided at the shoulder parts of the tube portion 1' and tube-forming rollers 10 disposed under the tube-forming rollers 9. The lug 7 of the belt is grasped from three directions by means of a pair of opposing guide rollers 11,11 and a pressing roller 12, such that both inner side edges of the belt constituting the lug are held in close contact with each other.

The guide rollers 11,11 and the pressing roller 12 are supported by a roller support 13 which is held on a frame 14 through bolts 14,14 received by elongated slots 13a,13a formed therein, for free adjustment of the vertical position.

Figure 6:
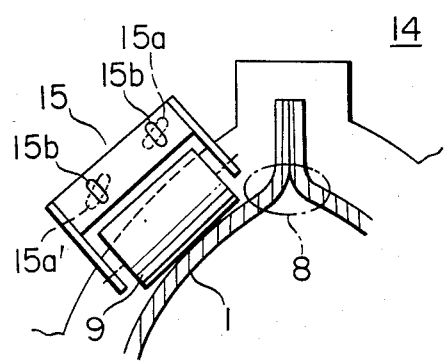
FIG. 6 is a front elevational view of one of the tube-forming rollers having a position and angle adjusting mechanism and used in the supporting and guiding means shown in FIG. 4.
Figure 7:
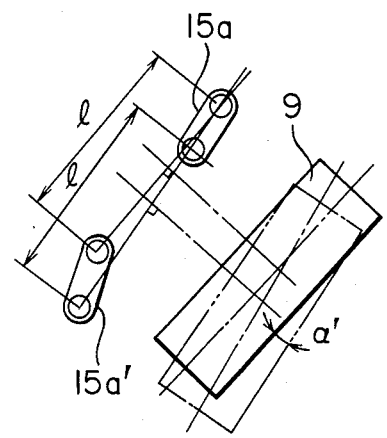
FIG. 7 is an illustration of the manner in which the adjustment of position and angle of the tube-forming roller shown in FIG. 6 are conducted.

A reference numeral 15 desginates a roller support for each of the tube-forming rollers 9 for restraining both lower ends of the intermediate flexible portions, i.e., the shoulder portions. The roller supports 15 for the left and right tube-forming rollers 9,9 are arranged in a pair. The roller supports 15,15 are provided with radially elongated slots 15b,15b, and are fastened to the frame 14 by means of bolts which are received in the elongated slots 15b,15b and the slots 15a,15a' which are formed in the frame 14 and cross the elongated slots 15b,15b. FIGS. 6 and 7 show the positional relationship between the slots 15a,15a' formed in the frame 14 and the tube-forming roller 9. Namely, since the slots 15a and 15a' have different degrees of angular offset, the roller 9 takes the position indicated by the solid line in FIG. 7 if the bolts are held in contact with the upper ends of the slots 15a,15a', whereas, when the bolts are retained by the lower ends of the slots 15a,15a', the roller takes the position shown by the broken line. Thus, the angle of contact between the shape maintaining roller 9 and the belt 1 can be varied over a predetermined angular range α.

The radial slots 15b formed in the roller support 15 permit an adjustment of the contact pressure of the tube-forming roller 9 on the belt 6, after determination of the contact angle afforded by the slots 15a,15a'. Practically, fine adjustment of the position of the roller support 15 both in the circumferential and radial directions is effected by a hand hammer which strikes the roller support back and forth. The aforementioned angular range α of adjustment is determined by the lengths and amounts of angular offset of the slots 15a,15a'.

Other tube-forming rollers 10,10, adapted to support both lateral side portions, lateral lower portions and the bottom portion of the tube portion 1' are supported by respective roller supports 16 which are secured to the frame 14 for free radial adjustment by means of radial slots formed therein.

These tube-forming rollers 9,10 are not arranged in a common plane but are offset in the longitudinal direction of the belt tube. Namely, the tube-forming rollers 10 shown by solid lines in FIG. 4, supporting both lateral sides and the bottom of the tube portion 1', are provided on the downstream side of the frame 14 while other shape-supporting rollers shown by broken lines, i.e., the rollers 9 for supporting the shoulders and the rollers 10 supporting both lateral lower portions, are provided on the upstream side of the frame 14 as viewed in the direction of movement of the belt, as will be seen from FIG. 5. As stated before, the pair of guide rollers 11 and the pressing roller 12 cooperating with the guide rollers 11 are disposed in the same plane, i.e., on the downstream side of the frame 14, thus securely grasping both longitudinal edges of the belt which constitute the lug 7.

The described embodiment of the tubular belt conveyor of the invention offers the following advantages:

(1) In the tubular belt conveyor of the invention, the belt 1 has no beads on the outer side thereof and the thickness of the belt is substantially constant over its entire breadth. It is, therefore, possible to use pulleys having an axial length greater than the breadth of the belt. In the conventional tubular belt conveyor, both side edges of the belt overhang to allow the lateral extremities to depend from both axial ends of the pulley and this results in a heavy local wear in the regions of the belt contacted by both axial end edges of the pulley. This problem, however, is overcome by the present invention because it is possible for the conveyor pulley to have an axial length greater than the breadth of the belt.

(2) Breaking or cutting of the side edges of the belt attributable to running along a winding path is avoided because the belt has no bead.

(3) The belt used in the tubular belt conveyor of the invention, having a uniform thickness along its breadth, can be vulcanized by an inexpensive mold.

(4) The packaging of the belt is facilitated because the belt has no beads which would resist coiling or increase the final size of the package.

In the embodiment shown in FIG. 4, the shape-maintaining rollers are adjustable radially by means of elongated slots formed in the respective roller supports. In particular, each of the tube-forming rollers 9 acting on the shoulders of the tube portion 1' of the belt is fastened by two bolts which are extended both through the slots formed in the frame and the slots formed in the roller support, for free adjustment of both the angle of contact of the roller 9 with the belt and the radial position of the same, thus adapting to various sizes of the tube portion 1'. This adjustment, however, relies upon the laborious manual work of hitting the roller support in one and the other directions, this work being particularly difficult to conduct when the belt is running.

Figure 8:
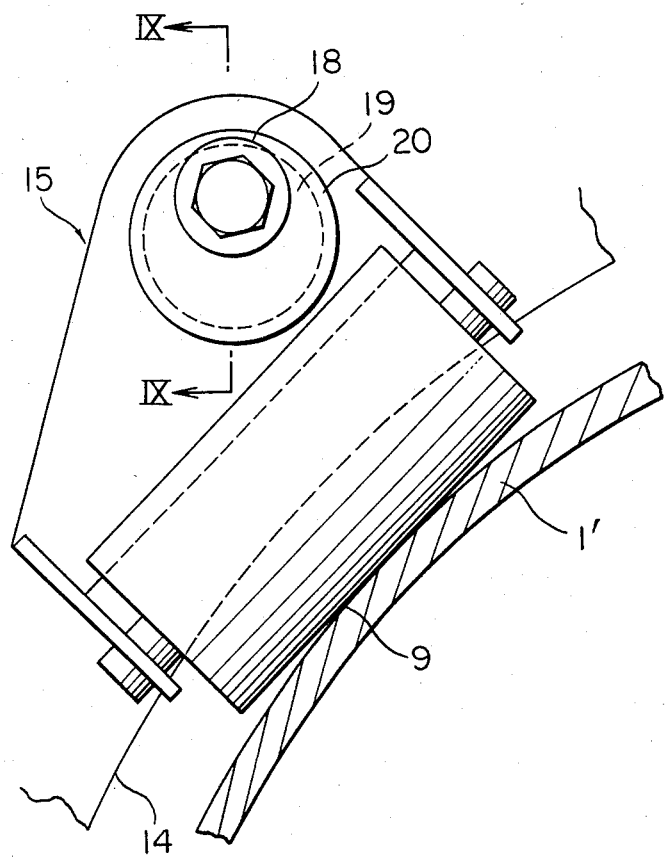
FIG. 8 is a front elevational view of another example of the position and angle adjusting mechanism for the tube-forming roller.
Figure 9:
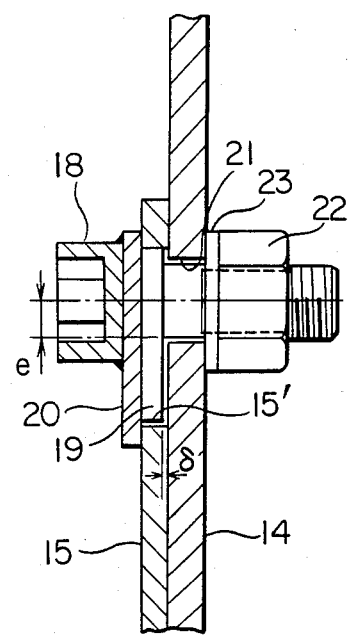
FIG. 9 is a sectional view taken along the line IX—IX of FIG. 8.

FIGS. 8 and 9 show another embodiment of the invention in which the contact angles of the tube-forming rollers, particularly the contact angles of the shape-maintaining rollers acting on the shoulders of the pipe portion, can be adjusted by an easy operation even during the running of the belt, thus saving any labour that might be required for optimizing the position and angle of the rollers with respect to the belt.

In this embodiment, the roller support 15 which supports the shoulder of the tube portion 1' of the belt has a circular hole 15' which receives an eccentric disc 19 of a thickness slightly smaller than the thickness of the roller support 15. The eccentric disc 19 has an eccentric shaft 18 formed integrally therewith and projecting axially from a radially offset portion thereof through the intermediary of a roller support retainer 20 which is coaxial with the eccentric disc 19 and has a diameter greater than the latter. The end of the shaft 18 opposite the roller support retainer 20 is threaded and extended through a hole 21 formed in the frame 14. A nut is screwed to the threaded end of the eccentric shaft 18 through a washer 23, thus securing the roller support 15 to the frame 14.

Provided that the nut 22 has been loosened, the roller support 15 is rotatable around the eccentric plate 19, and the eccentric shaft integral with the eccentric disc 19 is also rotatable within the hole 21 formed in the frame 14. In this state, the eccentric shaft 18 is rotated by a tool engaging the head thereof, so that the eccentric disc 19 makes an eccentric rotation about the axis of the eccentric shaft at a radius which equals the amount e of eccentricity. In a case where the head has a hexagonal shape, the tool may be a hexagonal wrench or a spanner.

Partly because the roller support 15 and the eccentric disc 19 are rotatable with respect to each other and partly because there is an eccentricity e, the position of the tube-forming roller 9 can be adjusted freely within a given plane. By effecting this adjustment while the belt is running, the roller 9 and the belt 1 press each other so that the optimum state of contact between the roller 9 and the belt 1 is obtained without substantial difficulty.

After the roller 9 has been optimumly positioned, the nut 22 is tightened, thus fixing the roller at this position. By suitably selecting the clearance δ shown in FIG. 9, the roller support 15 can be firmly gripped and fixed between the roller support retainer 20 and the frame 14.

In this case, the position of the roller support is adjustable within the region of ±e (e being the amount of eccentricity) about the axis of the eccentric shaft 18 and, in addition, an angular range of 360° about the axis of the eccentric shaft or the eccentric disc, which is in contrast to the arrangement shown in FIG. 4 in which adjustment is possible only within the region afforded by the elongated slots.

Thus, in the embodiment shown in FIGS. 8 and 9, the pressure of contact between the tube-forming roller and the belt is adjustable by a rotation of the eccentric shaft, while the angle of contact therebetween is adjustable by rotation of the roller support, so that the optimum state of contact is maintained between the belt and th tube-forming roller.

Therefore, the adjustment of the positions of the tube-forming rollers is very much facilitated and there is a remarkable saving of labour in the adjustment of the roller positions both during installation and during running of the belt. In some cases, a quick change of the cross-sectional shape of the conveyor is required, particularly at the shoulder portion, due to changes in the kind of material conveyed or the conditions of conveying. The embodiment explained in connection with FIGS. 8 and 9 can be made to comply with such a requirement quickly by a simple operation.

Figures 10, 11:
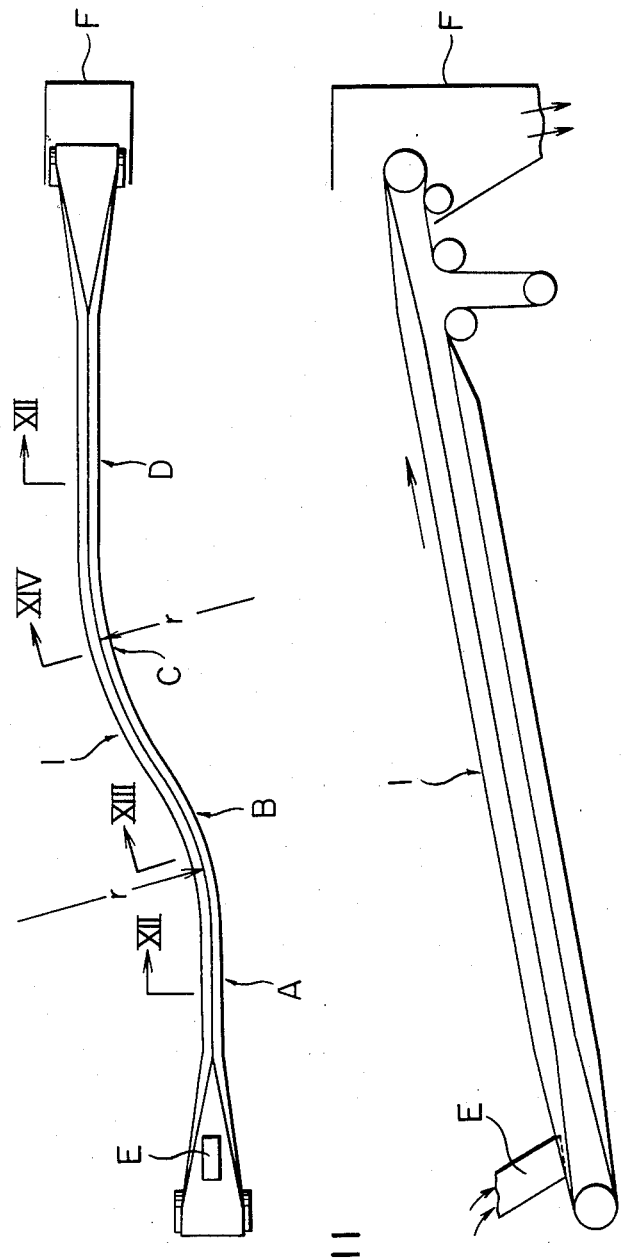
FIGS. 10 and 11 are respectively a schematic plan view and a schematic side elevational view of a tubular belt conveyor running along a path having a curved section.

FIG. 10 is a plan view of a tubular belt conveyor of the invention having a winding path along which the belt runs, while FIG. 11 is a side elevational view of the same.

The tubular belt conveyor has a material supplying end E from which the material to be conveyed is supplied into the conveyor and a material discharging end F into which the material is discharged from the conveyor. The conveyor belt 1 is flat when it is passing through the material supplying end E and the material discharging end F, while the portion passing through the intermediate part between these portions E and F is bent along the breadth to have a tubular form. The path of the conveyor includes a straight section A downstream of the material supplying end E, followed by a winding section B winding to the left as viewed in FIG. 10 which connects to a winding section C winding to the right, followed by a straight section D leading to the discharging end F. When the belt runs along the curved section of the path such as the section B or C, the radially inner and outer portions of the tube as viewed from the center of curvature are subjected to different levels of tension, so that a slip takes place between the mutually pressed longitudinal side edges of the belt constituting the lug. Conventionally, in order to minimize the influence of the difference in the tension on the lug of the running belt, countermeasures have been taken such as the employment of highly stretchable and contractable canvas in the radially outer side, i.e., tensed side, and the radially inner side, i.e., the compressed side, of the belt as viewed from the center of the curvature of the path. These countermeasures, however, are still insufficient for overcoming the above-described problems and impose other problems such as difficulty in the production of the conveyor belt.

Figure 12:
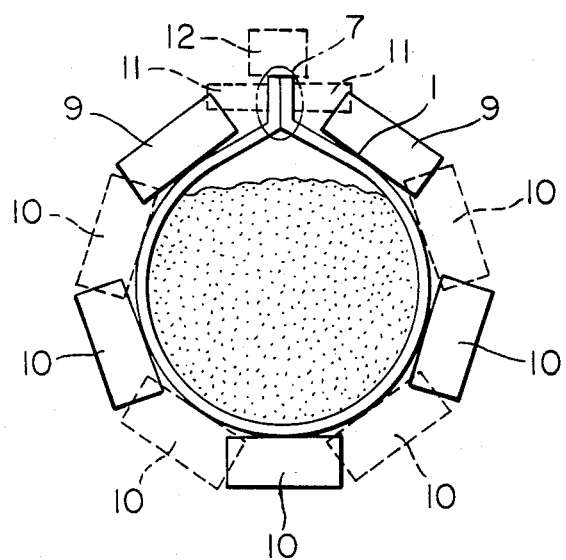
FIG. 12 is a front elevational view of a belt supporting and guiding means arranged along a straight section of the path of the belt in the tubular belt conveyor of the invention, as viewed in the direction of an arrow XII.
Figures 13, 14:
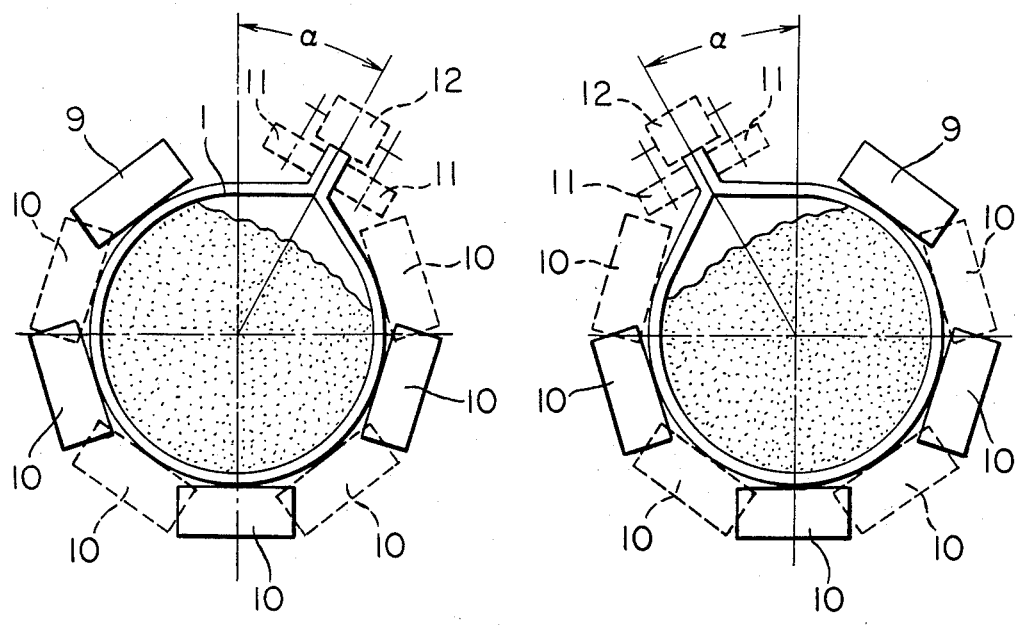
FIGS. 13 and 14 are front elevational views of the belt supporting and guiding means disposed along the curved sections B and C of the belt path in the tubular belt conveyor of the invention, as viewed in the directions of arrows XIII and XIV, respectively.

FIGS. 12, 13 and 14 show an embodiment in which, in order to overcome the above-described problems attributable to the curvature of the path of the belt, the roller arrangement in the belt supporting and guiding means in the curved sections B, C (see FIG. 10) is changed from that in the straight sections A, D. More specifically, FIG. 12 shows a belt supporting and guiding means employed in the straight sections A, D of the tubular belt conveyor, while FIGS. 13 and 14 show the constructions of the belt supporting and guiding means used in the curved sections B and C, respectively. The belt supporting and guiding means shown in FIG. 12 has a construction which is materially identical to that shown in FIG. 4, except that nine tube-forming rollers 9, 10 are used. Referring now to FIG. 13, the belt supporting and guiding means for use in the curved section B winding to the left in FIG. 10 has a construction which is somewhat modified from that shown in FIG. 12. More specifically, in the arrangement shown in FIG. 13, the guide rollers 11 and the pressing roller 12 are angularly offset to the right, as viewed in this Figure, by an angle of α from the upright position, and the shape-maintaining roller 9 for supporting the right shoulder of the tube portion of the belt, which is adjacent the right guide roller 11, is omitted. If the angular offset α is not so much large that the right shape-maintaining roller 9 interferes with the right guide roller 11, such omission of the roller may not be required. According to this arrangement, when the belt 1 runs along the curved section B shown in FIG. 10, the lug 7 of the belt is guided such that it is inclined to the right from the upright position as viewed in FIG. 13, i.e., to the radially outer side as viewed from the center of curvature of the curved section of the path. In consequence, the left portion of the belt as viewed in FIG. 13, i.e., the radially inner portion of the belt as viewed from the center of the curvature, is tensed, while the outer portion of the belt as viewed from the center of the curvature is compressed, thus negating the tension and compression which are generated due to the leftward winding of the belt along the curved section B of the belt path. Consequently, the belt as a whole is tensed uniformly, so that any undesirable slip in the lug 7 is avoided advantageously. The angular offset α is suitably determined in accordance with the curvature of the curved section B.

The belt supporting and guiding means shown in FIG. 14, intended for use in the rightwardly winding curved section C of the belt path shown in FIG. 10, has a construction materially identical to that explained in connection with FIG. 13, although in this case the rollers are arranged to cause a leftward inclination of the lug 7 as viewed in this Figure.

Although the invention has been described through specific terms, it is to be noted that the described embodiments are only illustrative and various changes and modifications may be imparted thereto without departing from the scope of the invention which is limited solely by the appended claims.

What is claimed is:

1. A tubular belt conveyor having a substantially flat endless belt for running between pulleys disposed at a material supplying end and a material discharging end, and a plurality of belt supporting and guiding means arranged in the direction of running of the endless belt for guiding the running belt while deforming the belt into a tubular form, wherein said endless belt has a substantially uniform thickness, without longitudinal grooves, indentations or projections, along its breadth and is deformable into a tubular form such that the longitudinal side edge portions of the surface thereof which is contacted by the material being conveyed abut each other thus forming a lug extending along the tube formed by said belt, said endless belt being provided between said tubular portion and said lug portion with an intermediate portion made of a flexible material different from the material of the other portions of the belt and having greater flexibility in said intermediate portion than the other portions of the belt, and wherein each of said belt guiding and supporting means includes a frame through which the deformed belt passes and on which are mounted a pair of guide rollers for clamping said lug from both sides thereof, a pressing roller having an axis orthogonal to the axes of said guide rollers and engageable with the radially outer end surface of said lug, and a plurality of tube-forming rollers arranged in angularly spaced relationship with each other around said tube for engaging the outer peripheral surface of said tube formed by said belt thus maintaining the tubular form of said belt wherein said pressing roller and a pair of said tube-forming rollers adjacent said pair of guide rollers are supported by respective roller supports which are secured to said frame through adjusting means for free adjustment of positions in the radial direction, and wherein the adjusting means of said tube-forming rollers adjacent said rollers are arranged such as to allow the axes of said rollers to be adjusted within a plane perpendicular to the tube formed by said belt.

2. A tubular belt conveyor according to claim 1, wherein said adjusting means for each of said pair of tube-forming rollers adjacent the pair of guide rollers has a pair of elongated slots formed in the associated roller support in parallel with each other and spaced from each other in the direction of the roller axis, a pair of elongated slots formed in predetermined portions of said frame corresponding to said slots in said roller support such as to cross said slots in said roller support at different angles, and a pair of bolts extended through corresponding slots in said roller support and frame.

3. A tubular belt conveyor according to claim 1, wherein said adjusting means for each of the pair of tube-forming rollers adjacent to the pair of guide rollers includes an eccentric shaft extending through a hole formed in a predetermined portion of said frame and having a threaded stem, a circular eccentric disc integrally fixed to said eccentric shaft at an eccentricity and having a thickness smaller than that of said roller support, a roller support retainer integrally fixed to said eccentric shaft in contact with said eccentric disc at the opposite side of said eccentric disc to said stem, said roller support retainer having a diameter greater than that of said eccentric disc, a circular hole formed in said roller support and rotatably receiving said eccentric disc, and a nut engaging with said threaded stem, whereby said roller support is clamped and held between said roller retainer and said supporting frame as said nut is tightened.

4. A tubular belt conveyor according to any one of claims 1, 2 or 3, wherein said belt runs along a path having at least one curved section, and wherein, in said belt supporting and guiding means disposed in the curved section of the path, said pair of guide rollers and said pressing roller are mounted at an angular offset in the direction opposite to the center of curvature of said curved section, wherein said lug is inclined radially outwardly as viewed from the center of curvature when said belt runs along said curved section.

5. A tubular belt conveyor according to claim 4, wherein one of said tube-forming rollers adjacent said pair of guide rollers, on the same side as the angular offset of said guide and pressing rollers, is omitted.

* * * * *